(No Model.)

J. J. SCHLIENTZ & J. F. FINK.
CASTER.

No. 528,210.  Patented Oct. 30, 1894.

Witnesses
Thos. E. Robertson
N. E. Clendaniel

Inventors
Joseph J. Schlientz
Jacob F. Fink
By T. J. W. Robertson
Attorney

UNITED STATES PATENT OFFICE.

JOSEPH J. SCHLIENTZ AND JACOB F. FINK, OF DEFIANCE, OHIO.

CASTER.

SPECIFICATION forming part of Letters Patent No. 528,210, dated October 30, 1894.

Application filed March 24, 1894. Serial No. 505,008. (No model.)

*To all whom it may concern:*

Be it known that we, JOSEPH J. SCHLIENTZ and JACOB F. FINK, citizens of the United States, residing at Defiance, in the county of Defiance and State of Ohio, having invented certain new and useful Improvements in Casters, of which the following is a specification, reference being had therein to the accompanying drawings.

This improvement is designed to provide a caster which besides being particularly adapted to prevent insects such as bugs, ants, &c., from crawling up the legs of bedsteads, refrigerators, provision safes, &c., will be found to be very cheaply made and convenient in use, and the invention consists in the peculiar construction, arrangement and combinations of parts hereinafter more particularly described and then definitely claimed.

Figure 1:
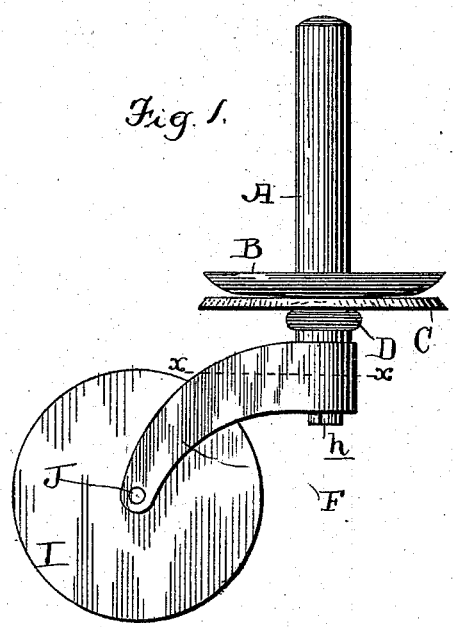
Figure 2:
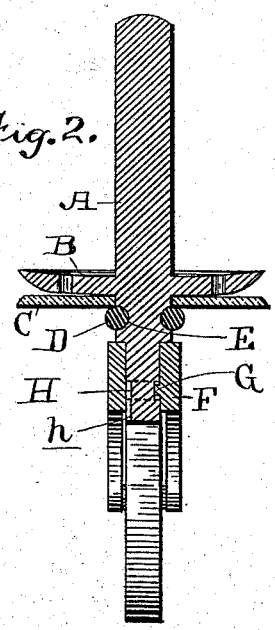
Figure 3:
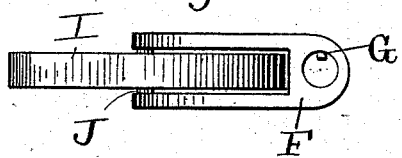
Figure 4:
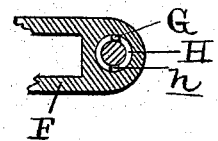

In the accompanying drawings—Figure 1 is a side view of a caster constructed according to our improvement. Fig. 2 is a vertical, central section of the same, taken at right angles to the view shown in Fig. 1. Fig. 3 is a plan of the trailer detached. Fig. 4 is a section through the line $x\ x$, Fig. 1.

Referring now to the details of the drawings by letter—A represents the stem or pin which may be provided with a disk B having holes for screws to screw the caster in place, or the disk may be made smaller and the pin driven in to hold it in place. If the screws are used, the pin may be made much shorter or the upper part entirely dispensed with.

Below the disk B is another disk or plate C, preferably of glass or porcelain which is held in place by a small rubber ring D, preferably set in a groove E, cast or otherwise formed in the pin A below the disk B.

The lower part of the pin is reduced to receive the trailer F, which is provided with a lug or pin G that enters into an annular groove H, having an extension downward, as shown at $h$. In the fork of the trailer is the usual caster wheel I, working on the journal pin J.

To assemble the parts, the glass plate C is first put on, and then the rubber ring D, which slips into the groove E and not only securely holds the plate C in place, but prevents the passage of insects between the inner edge of the glass and the pin.

To secure the trailer carrying the wheel, it is only necessary to turn said trailer on the pin A until the pin G is in line with the vertical groove $h$, when it will slip up into the annular groove H, and by giving the trailer a slight turn it will be held on the pin, and by turning it back again until it is over the groove $h$, it can be readily removed.

In attaching the caster, the pin should be so arranged that the groove $h$ will be outward, and the pin G set in the side of the trailer as shown, and thus there will be no probability of the trailer dropping off in lifting the bedstead, while said trailer can be readily removed if desired, by giving it a slight turn.

We prefer to use a glass plate, but it is obvious that a porcelain or metallic plate having a vitreous enamel formed on it may be used in place of glass.

The use of a disk or plate with a vitreous, glazed surface will prevent the passage over its under side of any bugs, ants or other like insects, and thus housekeepers may be rid of the trouble caused by these pests.

We deem it important that the disk C should have a vitreous surface, inasmuch as a metal disk without a vitreous surface (as has been proposed) would be likely to corrode or rust and thus would form no barrier to the ascent of insects.

By the construction and arrangement of parts shown, the different parts may readily be removed in case of breakage and replaced by others if required, thus saving the expense of an entire new caster.

We are aware that a glass socket has been used in a piano to receive the stem of a caster, but we regard this as essentially different from our improvement, for in such case the entire weight of the piano would come on the glass sockets which would render them liable to be broken under the strain due to persons getting into a bed on a bedstead supplied with such glass sockets for the casters, while in our arrangement there is no strain on the glass at all, there being a flange on the stem that receives all the strain.

What we claim as new is—

1. As an improved article of manufacture, a caster having a stem A, a disk B fast thereon to receive the pressure of the bedstead, and a disk C having a vitreous under surface, arranged below the disk B, substantially as and for the purpose specified.

2. As an improved article of manufacture, a caster having a stem A provided with a groove E, a disk B fast on said stem, a second disk C having a vitreous under surface below said disk B, and a rubber ring fitting in said groove E, all substantially as described and shown.

In testimony whereof we affix our signatures, in presence of two witnesses, this 22d day of March, 1894.

JOSEPH J. SCHLIENTZ.
JACOB F. FINK.

Witnesses:
R. H. GLEASON,
J. I. HALE.